Aug. 21, 1945.  H. E. EDGERTON  2,382,981
METHOD OF AND APPARATUS FOR TESTING
Filed Sept. 9, 1941  3 Sheets-Sheet 1
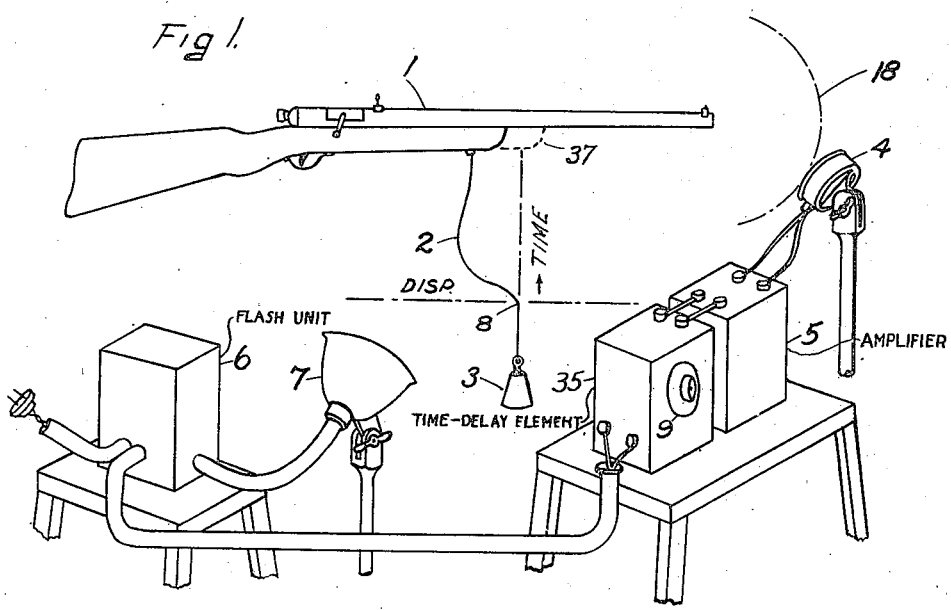
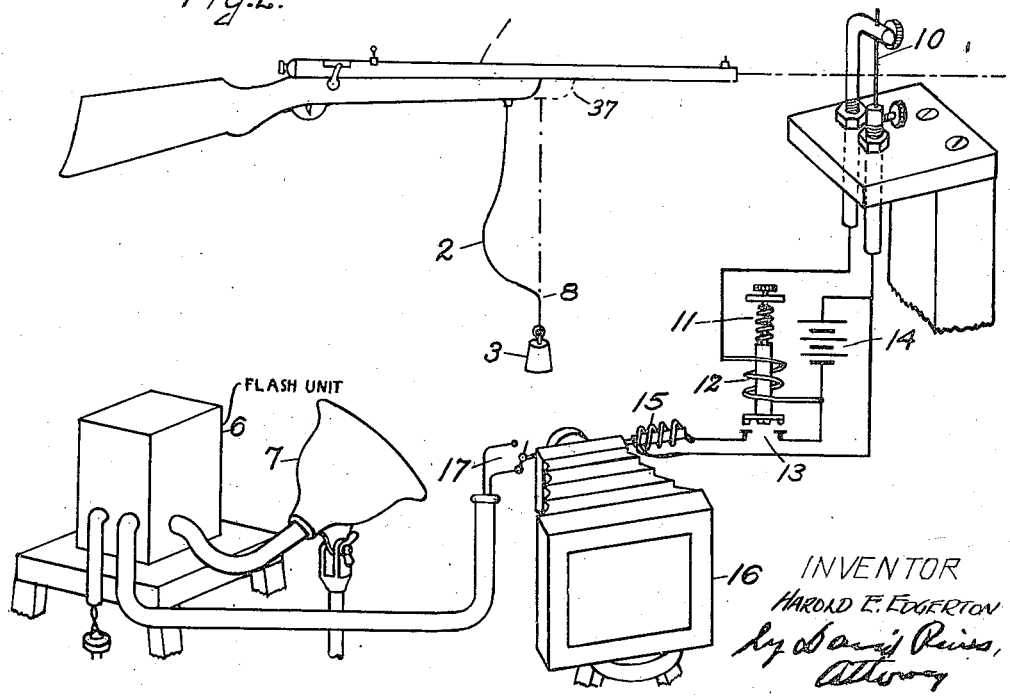
INVENTOR
HAROLD E. EDGERTON Aug. 21, 1945.  H. E. EDGERTON  2,382,981
METHOD OF AND APPARATUS FOR TESTING
Filed Sept. 9, 1941  3 Sheets-Sheet 2
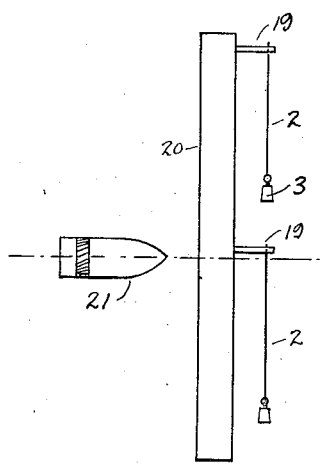
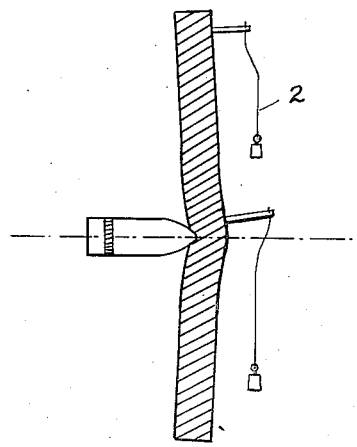
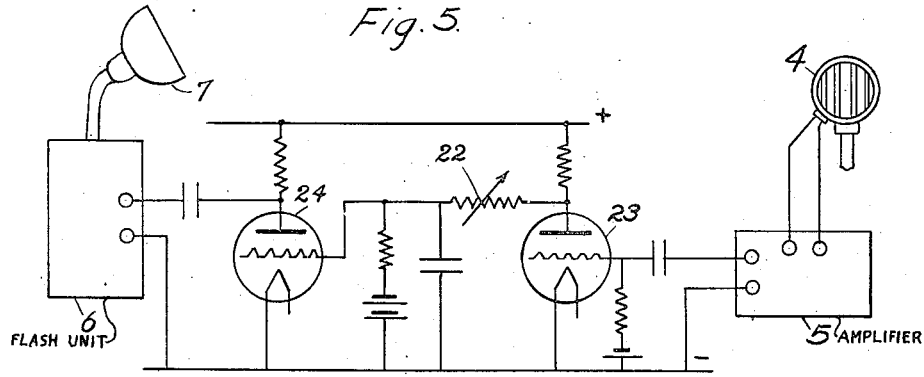
INVENTOR
HAROLD E EDGERTON Aug. 21, 1945.     H. E. EDGERTON     2,382,981
METHOD OF AND APPARATUS FOR TESTING
Filed Sept. 9, 1941     3 Sheets-Sheet 3
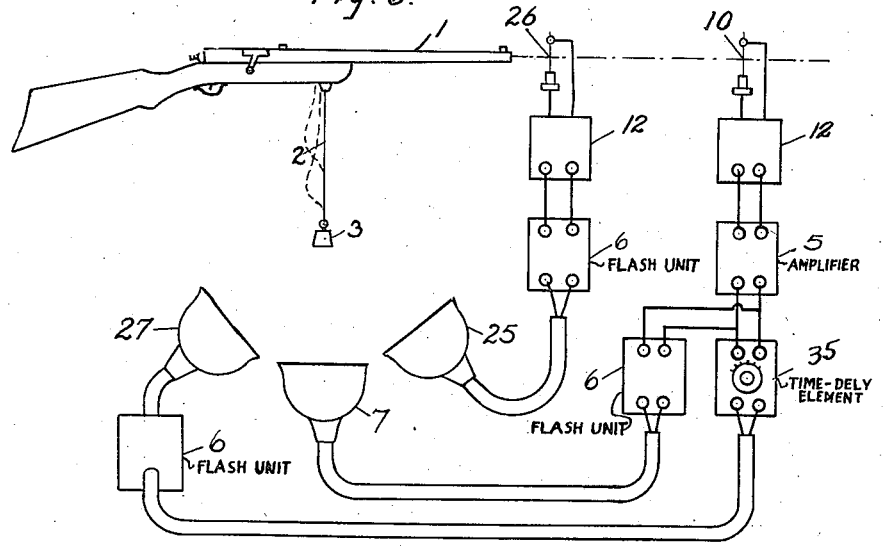
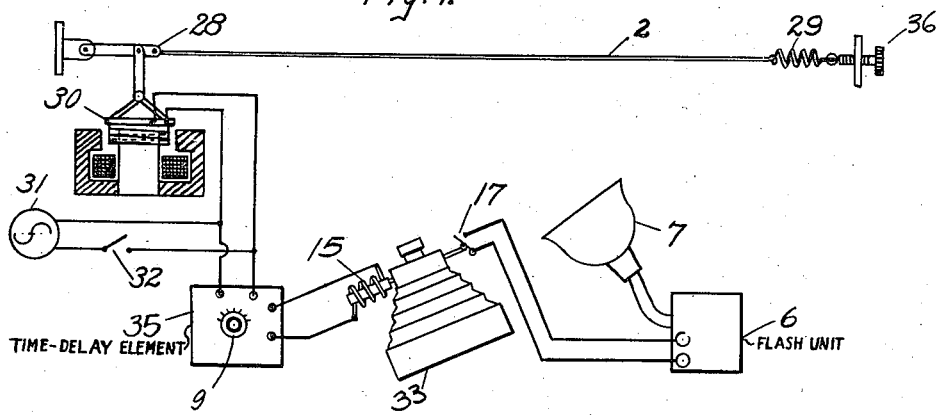
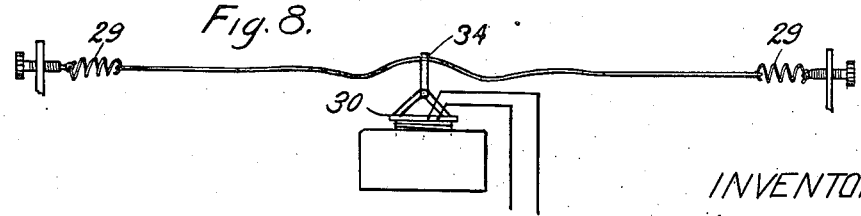
INVENTOR
HAROLD E. EDGERTON
by David Rines,
Attorney Patented Aug. 21, 1945

2,382,981

UNITED STATES PATENT OFFICE 2,382,981

METHOD OF AND APPARATUS FOR TESTING

Harold E. Edgerton, Belmont, Mass.

Application September 9, 1941, Serial No. 410,175

32 Claims. (Cl. 73—167)

The present invention relates to methods of and apparatus for testing, and more particularly to methods of and apparatus for obtaining curves showing the displacement of an object as a function of time.

According to present-day practice, it is possible to obtain engineering information concerning rapidly accelerated objects, such as guns, armor plate, impact-testing machines, and the like, with the aid of various pick-up devices utilizing magnetic, piezoelectric and resistance methods, and an oscillograph to record the displacement as a function of time. High-speed motion pictures have also been employed. All these prior-art methods, however, are disadvantageous, because of complexity.

An object of the present invention is to provide a novel, simple and easily practised method of obtaining the above information, and novel apparatus for the carrying out of this method.

Another object is to provide a novel oscillograph.

Other and further objects will be explained hereinafter and will be particularly pointed out in the appended claims.

The invention will now be explained in connection with the accompanying drawings, in which Fig. 1 is a diagrammatic view illustrating the invention as applied to the measurement of the displacement caused by the recoil of a gun; Fig. 2 is a view of a modification adapted for use with flash photography; Fig. 3 is a view illustrative of a shell about to strike an armor plate; Fig. 4 is a similar view after the armor plate has been struck by the shell; Fig. 5 is a circuit of an adjustable electrical time-delay relay; Fig. 6 is a view similar to Fig. 1 of a modification; Fig. 7 is a similar view illustrating a novel oscillograph; and Fig. 8 is a similar view of a modification.

The upper end of a stretched string or wire or other flexible member 2 is shown in Figs. 1 and 2 fixed to the barrel of a rifle 1 the recoil motion of which it is desired to determine. The string 2 is maintained tensioned by a weight 3 fastened to its lower end. The tension may be introduced by other forces than by the weight 3; for example, with the aid of a spring or springs 29, as shown in Figs. 7 and 8, the strength of which may be adjusted by means of a thumb screw or screws 36, or by means of a rubber band, or in any other desired way.

Normally and initially the string 2 is maintained vertically disposed by the weight 3, as shown by the dot-and-dash line of Figs. 1 and 2, and in full in Fig. 6. In Figs. 1 and 2, the portion of the gun to which the upper end of the string is attached is shown by dotted lines 37. At the moment of firing, however, a sudden force is mechanically applied that causes the gun to recoil in a backward direction, to the full-line position of Figs 1 and 2. This sudden force is transmitted through the gun 1 to the said upper end of the string 2. Immediately after the recoil, the gun 1 moves forward again, to the position indicated by the dotted lines 37.

In Figs. 1 and 2, the position assumed by the upper end of the string is shown just after the gun 1 has been fired. This upper end of the string moves first over to the left, and then to the right again. This transient motion may be tested according to the present invention, by reason of the fact that it produces in the string 2 a resulting wave having an amplitude variation determined by the motion of the gun. The amplitude wave progresses down the string at a constant velocity which is determined by the constants of the string 2 and the weight 3. The velocity of the wave can be set by employing different constants to suit best the particular problem in hand. The wave impulse will travel down the string toward its lower end.

The sound originating at the open end of the barrel of the gun in response to the report of the gun when fired may travel outward as a spherical wave surface 18. When this sound-wave surface 18 reaches a microphone 4 or other electrical pick-up, illustrated in Figs. 1 and 5, it will produce an electrical signal that may be amplified by an amplifier 5, and the amplified signal may be transmitted to a flash unit 6, such as one of the units illustrated and described in the Edgerton application, Serial No. 340,580, filed June 14, 1940, to which reference may be made for further details. It is not essential, however, that the particular unit disclosed in that application be employed. All that is essential is that the amplified signal operate through a normally ineffective electric circuit to render it effective, thus to trip a flash-lamp 7. This flash-lamp, too, may, if desired, be of the nature disclosed in the said application. It produces momentarily an instantaneous flash and is then immediately extinguished. This flash takes place a predetermined time after the application of the force resulting from the firing of the gun.

The flash-lamp 7 is caused to flash at the moment that the wave in the string 2 has reached the uppermost undisturbed point 8 of the string during its travel from the gun, at the upper end of the string, toward the weight 3. The shape of the wave at the point 8 is thus rendered immediately visible at the moment of flash, without blur. It is desirable that this illumination take place before the wave reaches the weight 3, at the bottom of the string 2, else the wave would become reflected from the weight 3 and the analysis of the record would become complicated. The deflections, involve a proper determination of the displacement as a function of time. A camera (not shown in Fig. 1), with a manually operated shutter, may be used to photograph the position of the string.

In order that the flash may be caused to take place at the proper time, irrespective of the proximity of the microphone 4 to the gun, an adjustable time-delay element 35 may be connected to the amplifier 5 to allow additional time for the progress of the wave down the string. The time of flash may be controlled by setting a dial 9 of the time-delay element 35. This dial 9 may control a variable resistor 22 (Fig. 5) in the output circuit of a gas-filled trigger tube 23, the input circuit of which is connected to the amplifier 5. This output circuit, in turn, is connected to the input circuit of another vacuum tube 24, the output circuit of which is connected to the flash unit 6. A signal is produced in the output after the input signal reaches a predetermined value.

The correct timing of the flash photograph is very important. Several automatic methods for effecting this timing are illustrated. The photograph is taken with the system shown in Fig. 1, as already explained, for example, when the sound wave 18 strikes the electrical pickup 4, as determined by the adjustable time-delay device 35. Fig. 2 shows a mechanical method whereby a small electrical wire 10 is broken. The bullet from the gun 1 travels in a path in which the small wire 10 is interposed. The wire 10 is connected in circuit with the unit 6 and the flash-lamp 7. The bullet, by rupturing the wire 10, opens this circuit. A normally open relay 12 in this circuit is thereupon caused to close by gravity or a compression spring 11 into contact with a contact member 13. A battery 14 is then caused to energize a trip magnet 15 of the shutter of a camera 16. This effects operation of a camera-shutter synchronizing switch 17, which effects flashing of the lamp and exposure upon a film in the camera 16. Details of the operation of the camera and its shutter and synchronizing switch may be found in the said application.

It is often convenient to employ a second flash-lamp 25, as illustrated in Fig. 6, to produce upon the same film another exposure prior to the exposure produced by the flash-lamp 7, and this at a known time when the string is vertically disposed, in its initial position, at the instant that the bullet leaves the muzzle of the gun 1. Compensation may thus be made for slight movements of the string 2 that may be caused by windage and vibration. The flash-lamp 25 may be operated by a circuit similar to that described above in connection with the circuit for controlling the flash-lamp 7; and this circuit may be set into operation by a wire 26, similar to the wire 10, disposed at the very muzzle of the gun 1. The instantaneous flash from the flash-lamp 25 is thus produced at the instant that the bullet leaves the muzzle of the gun.

It may be further convenient, as also illustrated in Fig. 6, to make still a third exposure upon the film at a definite predetermined known time after the predetermined time of the second exposure, produced by the flash lamp 7. This makes possible a direct calibration of the velocity of the wave on the string, and it also shows what attenuation is experienced by the wave as it progresses along the string. The positions occupied by the string at the three different known times is illustrated by the full-line and the two dotted-line positions in Fig. 6.

The third exposure may be effected with the aid of still a third flash-lamp 27 (Fig. 6). This third flash-lamp 27 may be operated by still a third wire (not shown) similar to the wires 10 and 26. It is preferred, however, as illustrated in Fig. 6, to flash the flash-lamp 7 from the same microphone 4 or the wire 10, without time delay, and to flash the flash-lamp 27 after a time delay.

Though the gun 1 is shown horizontal, at right angles to the direction of extension of the string 2, it may be disposed at any other desired angle. By means of a pulley or pulleys or other mechanism, moreover, the string may assume any other desired position than the vertical. Where the motion of the string is at right angles to the direction of the force applied to its upper end, however, the computation is facilitated.

In Fig. 3, for example, two strings 2 are shown respectively connected to two supports 19 of an armor plate 20 that is about to be struck by a shell 21. One of the two strings 2 is shown supported by one of the supports 19 at the middle of the armor plate 20 and the other by the other support 19, at the upper end thereof. At the moment of impact of the shell 21, the armor plate will yield. The said one support 19 will, at that moment, be driven outward, and the said other support 19 will be driven inward. Later, the directions of movement of the supports 19 will be reversed. These movements will be correspondingly recorded upon the strings 2, as shown in Fig. 4.

In all the instances described above, the upper end of the string 2 has been actuated mechanically. According to the modification of Fig. 7, the mechanical motion at one end 28 of the string 2, corresponding to the upper end of the string shown in Figs. 1 to 6, may be produced electromagnetically, as with the aid of a loud-speaker device 30. The energy for the loud-speaker device 30 may be provided from any source 31 of alternating or transient currents. At the moment of connecting this source 31 to the loud-speaker 30 and the time-delay element 35 as by the closing of a switch 32, a wave is started along the string 2, from the end 28 to its opposite end, controlled by the spring 29. A camera 33 may be set in readiness, with the shutter open to take the exposure produced by the flash-lamp 7. The shutter may be operated in response to the operation of the synchronizing switch 17, in the same way as described in connection with the description of Fig. 2, except that the switch 17 closes in response to the operation of the switch 32. A novel oscillographic record may thus be produced corresponding to the current variations of the source 31.

To improve the operation, the loud-speaker device 30 may be disposed at the half-way point 34 of the string, as illustrated in Fig. 8, the ends of the string each being tensioned by a spring 29. The parts of the string on both sides of the half-way point 34 will be subjected to the same type of wave as in Fig. 7, but symmetrically. The operation of the systems shown in Figs. 7 and 8 is the same as that of the other systems shown. The closing of the switch 32 starts a transient in the tensioned member 2 to produce a traveling wave, and the photographic record is made of an isolated position of the traveling wave.

Further modifications will occur to persons skilled in the art, and all such are considered to fall within the spirit and scope of the invention as defined in the appended claims.

What is claimed is:

1. Apparatus of the character described having, in combination, a flexible member a portion of which is supported by a yieldable support, means for tensioning the member, means for applying a force to the support to transmit a force through the support to the said portion of the member in a direction at an angle to the direction of extension of the member, thereby to introduce a traveling wave in the member, and means for determining the position of the traveling wave at a predetermined time after the application of the force and prior to the moment when the traveling wave becomes reflected.

2. Apparatus of the character described having in combination, a flexible member having two ends one of which is supported by a yieldable support, means for exerting a tensioning force upon the other end to maintain the member under tension, means for applying a force to the support to transmit a force through the support to the said one end of the member in a direction at an angle to the direction of extension of the member, thereby to introduce in the member a wave traveling from the said one end toward the said other end, and means for determining the amplitude of the traveling wave at a predetermined time after the application of the force and prior to the moment when the traveling wave becomes reflected from the said other end.

3. Apparatus of the character described having, in combination, a flexible member having two ends one of which is supported by a yieldable support, means for exerting a tensioning force upon the other end to maintain the member under tension, means for applying a force to the support to transmit a force through the support to the said one end of the member in a direction at an angle to the direction of extension of the member, thereby to introduce in the member a wave traveling from the said one end toward the said other end, and means operable at a predetermined time after the application of the force for producing a flash to illuminate the traveling wave, thereby to render the traveling wave momentarily perceptible without blur at the predetermined time.

4. Apparatus of the character described having, in combination, a flexible member having two ends one of which is supported by a yieldable support, means for exerting a tensioning force upon the other end to maintain the member under tension, means for applying a force to the support to transmit a force through the support to the said one end of the member in a direction at an angle to the direction of extension of the member, thereby to introduce in the member a wave traveling from the said one end toward the said other end, means operable at a predetermined time after the application of the force for producing a flash to illuminate the traveling wave, thereby to render the traveling wave momentarily perceptible without blur at the predetermined time, and means for recording the momentarily perceptible traveling wave.

5. Apparatus of the character described having, in combination, a flexible member having two ends one of which is supported by a yieldable support, means for exerting a tensioning force upon the other end to maintain the member under tension, means for applying a force to the support to transmit a force through the support to the said one end of the member in a direction at an angle to the direction of extension of the member, thereby to introduce in the member a wave traveling from the said one end toward the said other end, means operable at a predetermined time after the application of the force for producing a flash to illuminate the traveling wave, thereby to render the traveling wave momentarily perceptible without blur at the predetermined time, and means for photographing the momentarily perceptible traveling wave.

6. Apparatus of the character described having, in combination, a flexible member having two ends one of which is supported by a yieldable support, means for exerting a tensioning force upon the other end to maintain the member under tension, means for applying a force to the support to transmit a force through the support to the said one end of the member in a direction at an angle to the direction of extension of the member, thereby to introduce in the member a wave traveling from the said one end toward the said other end, and means operable at a predetermined time after the application of the force for momentarily illuminating the traveling wave, thereby to render the traveling wave momentarily perceptible without blur at the predetermined time.

7. Apparatus of the character described having, in combination, a flexible member having two ends one of which is supported by a yieldable support, means for exerting a tensioning force upon the other end to maintain the member under tension, means for applying a force to the support to transmit a force through the support to the said one end of the member in a direction at an angle to the direction of extension of the member, thereby to introduce in the member a wave traveling from the said one end toward the said other end, means set into operation by the force for producing a sound, and means controlled by the sound for momentarily illuminating the waved member.

8. Apparatus of the character described having, in combination, a flexible member having two ends one of which is supported by a yieldable support, means for exerting a tensioning force upon the other end to maintain the member under tension, means for applying a force to the support to transmit a force through the support to the said one end of the member in a direction at an angle to the direction of extension of the member, thereby to introduce in the member a wave traveling from the said one end toward the said other end, a flash-lamp, a normally ineffective electric circuit for flashing the flash-lamp, and means operable at a predetermined time after the application of the force for rendering the electric circuit effective to flash the flash-lamp to illuminate the traveling wave, thereby to render the traveling wave momentarily perceptible without blur at the predetermined time.

9. Apparatus of the character described having, in combination, a flexible member having two ends one of which is supported by a yieldable support, means for exerting a tensioning force upon the other end to maintain the member under tension, means for applying a force to the support to transmit a force through the support to the said one end of the member in a direction at an angle to the direction of extension of the member, thereby to introduce in the member a wave traveling from the said one end toward the said other end, a flash-lamp, a normally ineffective electric circuit for flashing the flash-lamp, means set into operation by the force for producing a sound, and means controlled by the sound for rendering the electric circuit effective.

10. Apparatus of the character described having, in combination, a flexible member having two ends one of which is supported by a yieldable support, means for exerting a tensioning force upon the other end to maintain the member under tension, means for applying a force to the support to transmit a force through the support to the said one end of the member in a direction at an angle to the direction of extension of the member, thereby to introduce in the member a wave traveling from the said one end toward the said other end, and means for photographing the member both substantially at the time of and after the application of the force and prior to the moment when the traveling wave becomes reflected from the said other end.

11. Apparatus of the character described having, in combination, a flexible member having two ends one of which is supported by a yieldable support, means for exerting a tensioning force upon the other end to maintain the member under tension, means for applying a force to the support to transmit a force through the support to the said one end of the member in a direction at an angle to the direction of extension of the member, thereby to introduce in the member a wave traveling from the said one end toward the said other end, and means for photographing the member at predetermined times after the application of the force and prior to the moment when the traveling wave becomes reflected from the said other end.

12. Apparatus of the character described having, in combination, a flexible member having two ends one of which is supported by a yieldable support, means for exerting a tensioning force upon the other end to maintain the member under tension, means for applying a force to the support to transmit a force through the support to the said one end of the member in a direction at an angle to the direction of extension of the member, thereby to introduce in the member a wave traveling from the said one end toward the said other end, a flash-lamp, a camera having a shutter, means controlled by the shutter for flashing the lamp, and means operable at a predetermined time after the application of the force for controlling the shutter.

13. Apparatus of the character described having, in combination, a flexible member having two ends one of which is supported by a yieldable support, means for exerting a tensioning force upon the other end to maintain the member under tension, means for applying a force to the support to transmit a force through the support to the said one end of the member in a direction at an angle to the direction of extension of the member, thereby to introduce in the member a wave traveling from the said one end toward the said other end, a flash-lamp, a normally ineffective electric circuit for flashing the flash-lamp, an element rupture of which renders the electric circuit effective, and means operable at a predetermined time after the application of the force for rupturing the element.

14. An oscillograph having, in combination, a flexible member having two ends, one of which is supported by a yieldable support, means for exerting a tensioning force upon the other end to maintain the member under tension, means for electromagnetically driving the support to transmit a force through the support to the said one end of the member in a direction at an angle to the direction of extension of the member, thereby to introduce in the member a wave traveling from the said one end toward the said other end, and means for determining the position of the traveling wave at a predetermined time after the application of the force and prior to the moment when the traveling wave becomes reflected.

15. A method of determining the recoil motion of the barrel of a rifle comprising fixing to the barrel the upper end of a flexible member, weighting the lower end of the member to tension the member, firing the rifle to apply a force to the upper end of the member, thereby to introduce a traveling wave in the member, and observing the position of the traveling wave as a function of time.

16. Apparatus for determining the recoil motion of the barrel of a rifle having, in combination, a flexible member one end of which is fixed to the barrel, means for tensioning the member, whereby, upon the firing of the rifle, a force will be applied to the upper end of the member, thereby to introduce a traveling wave in the member, and means for determining the position of the traveling wave at a predetermined time after the application of the force.

17. Apparatus for determining the recoil motion of the barrel of a rifle having, in combination, a flexible member one end of which is fixed to the barrel, means for tensioning the member, whereby, upon the firing of the rifle, a force will be applied to the upper end of the member, thereby to introduce a traveling wave in the member, normally ineffective means for momentarily illuminating the waved member, and means positioned at a predetermined distance from the rifle and operable in response to the sound of the report of the rifle after it is fired for rendering the illuminating means effective.

18. Apparatus of the character described having, in combination, a flexible member a portion of which is supported by a yieldable support, means for tensioning the member, means for applying a force to the support to transmit a force through the support to the said portion of the member in a direction at an angle to the direction of extension of the member, thereby to introduce a traveling wave in the member, and means for momentarily illuminating the waved member at a moment prior to the moment when the traveling wave becomes reflected.

19. Apparatus of the character described having, in combination, a flexible member supported by a yieldable support, means for tensioning the member, means for applying a force to the support to transmit a force through the support to the member in a direction at an angle to the direction of extension of the member, thereby to introduce a traveling wave in the member, means set into operation by the force for producing a sound, normally ineffective means for momentarily illuminating the waved member, and means positioned at a predetermined distance from the support and operable in response to the sound for rendering the illuminating means effective.

20. Apparatus of the character described having, in combination, a flexible member a portion of which is supported by a yieldable support, means for tensioning the member, means for applying a force to the support to transmit a force through the support to the said portion of the member in a direction at an angle to the direction of extension of the member, thereby to introduce a traveling wave in the member, normally ineffective means for momentarily illuminating the waved member, and means for rendering the illuminating means effective at a predetermined time prior to the moment when the traveling wave becomes reflected.

21. Apparatus of the character described having, in combination, a flexible member having two ends, means for exerting a tensioning force upon the ends of the member to maintain the member under tension, means for applying a force to the member in a direction at an angle to the direction of extension of the member, thereby to introduce a traveling wave in the member, a flash-lamp, a camera, means controlled by the camera for flashing the lamp, and means operable at a predetermined time after the operation of the force for rendering the camera-controlled means effective to produce a flashing of the lamp to illuminate the traveling wave, thereby to render the traveling wave momentarily perceptible without blur at the predetermined time.

22. A method of the character described comprising fixing to a movable element the upper end of a flexible member, weighting the lower end of the member to tension the member, moving the movable element to apply a force to the upper end of the member, thereby to introduce a traveling wave in the member, and observing the position of the traveling wave as a function of time at a moment prior to the moment when the traveling wave becomes reflected from the lower end of the member.

23. Apparatus of the character described having, in combination, a flexible member having two ends, means for exerting a tensioning force upon the ends of the member to maintain the member under tension, means for applying a force to the member in a direction at an angle to the direction of extension of the member, thereby to introduce a traveling wave in the member, normally ineffective means for momentarily illuminating the traveling wave, means set into operation by the force for producing a sound, and means positioned at a predetermined distance from the member and operable in response to the sound for rendering the illuminating means effective.

24. A method of testing a transient motion applied to a flexible member that comprises tensioning the member, applying the motion to the tensioned member in a direction at an angle to the direction of extension of the tensioned member at a point of the member that may become displaced in response to the application of the motion, thereby to introduce a traveling wave in the tensioned member, and determining the position of the traveling wave as a function of time at a moment prior to the moment when the traveling wave becomes reflected.

25. A method of testing a transient motion applied to a flexible member having two ends that comprises holding one end of the member, creating a tensioning force upon the other end to maintain the member under tension, applying the motion to the said one end of the tensioned member in a direction at an angle to the direction of extension of the tensioned member to displace the said one end in response to the application of the motion, thereby to introduce in the tensioned member a wave traveling from the said one end toward the said other end, and determining the position of the traveling wave as a function of time at a moment prior to the moment when the traveling wave becomes reflected from the said other end.

26. A method of testing a transient motion applied to a flexible member that comprises tensioning the member, applying the motion to the tensioned member in a direction at an angle to the direction of extension of the tensioned member at a point of the member that may become displaced in response to the application of the motion, thereby to introduce a traveling wave in the tensioned member, and comparing the positions of the member at different known times prior to the moment when the traveling wave becomes reflected to calibrate the velocity of the wave.

27. A method of testing a transient motion applied to a flexible member that comprises tensioning the member, applying the motion to the tensioned member in a direction at an angle to the direction of extension of the tensioned member at a point of the member that may become displaced in response to the application of the motion, thereby to introduce a traveling wave in the tensioned member, and comparing the positions and the amplitudes of the wave at different known times prior to the moment when the traveling wave becomes reflected to calibrate the velocity and the attenuation of the wave.

28. Apparatus for testing a transient motion having, in combination, a flexible member having two ends at which it is yieldingly supported, means for exerting a tensioning force upon one of the ends of the member to maintain the member under tension, means for applying the motion at an intermediate point of the tensioned member in a direction at an angle to the direction of extension of the tensioned member to cause the member to become displaced at the intermediate point in response to the application of the motion, thereby to introduce in the member waves traveling from the intermediate point toward the ends of the member, and means for determining the position of the traveling wave as a function of time at a moment prior to the amount when the traveling wave becomes reflected.

29. A method of testing a transient motion applied to a flexible member that comprises tensioning the member, applying the motion to the tensioned member in a direction at an angle to the direction of extension of the tensioned member at a point of the member that may become displaced in response to the application of the motion, thereby to introduce a traveling wave in the tensioned member, and momentarily illuminating the tensioned member at a predetermined time after the application of the motion and prior to the moment when the traveling wave becomes reflected to render the traveling wave momentarily perceptible without blur at the predetermined time.

30. Apparatus for testing a transient motion having, in combination, a flexible member having two ends, means for holding one of the ends of the member, means for exerting a tensioning force upon the other end of the member to maintain the member under tension, means for applying the motion at an intermediate point of the tensioned member in a direction at an angle to the direction of extension of the tensioned member to cause the member to become displaced at the intermediate point in response to the application of the motion, thereby to introduce in the member waves traveling from the intermediate point toward the ends of the member, and means for determining the position of the traveling wave as a function of time at a moment prior to the moment when the traveling wave becomes reflected.

31. An oscillograph having, in combination, a flexible member having two ends, means for holding one of the ends of the member, means for exerting a tensioning force upon the other end of the member to maintain the member under tension, means for electromagnetically applying a transient motion to the tensioned member in a direction at an angle to the direction of extension of the tensioned member to cause the member to become displaced in response to the application of the motion, thereby to introduce a traveling wave in the member, and means for determining the position of the traveling wave as a function of time at a moment prior to the moment when the traveling wave becomes reflected.

32. Apparatus for testing a transient motion having, in combination, a flexible member having two ends, means for holding one of the ends of the member, means for exerting a tensioning force upon the other end of the member to maintain the member under tension, means for applying the motion to the tensioned member in a direction at an angle to the direction of extension of the tensioned member at a point of the member that may become displaced in response to the application of the motion, thereby to introduce a traveling wave in the tensioned member, and means operable at a predetermined time after the application of the force and prior to the moment when the traveling wave becomes reflected for momentarily illuminating the traveling wave, thereby to render the traveling wave momentarily perceptible without blur at the predetermined time.

HAROLD E. EDGERTON.